July 12, 1955

O. F. TREFZ 2,712,817

DIAMOND RADIUS AND ANGLE DRESSER

Original Filed Jan. 24, 1952

INVENTOR.
OTTO F. TREFZ
BY
Caesar and Rivise
ATTORNEYS.

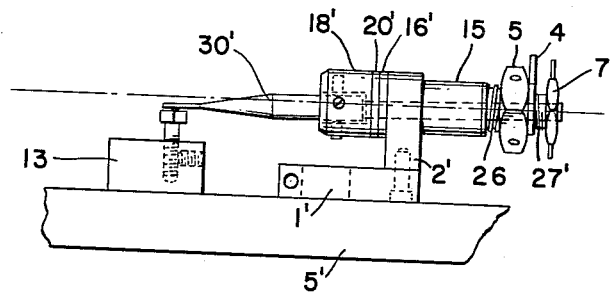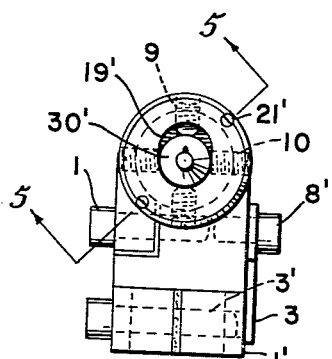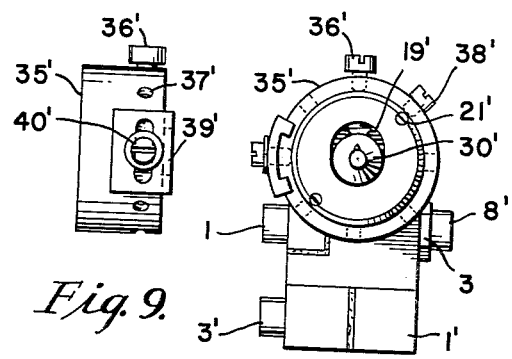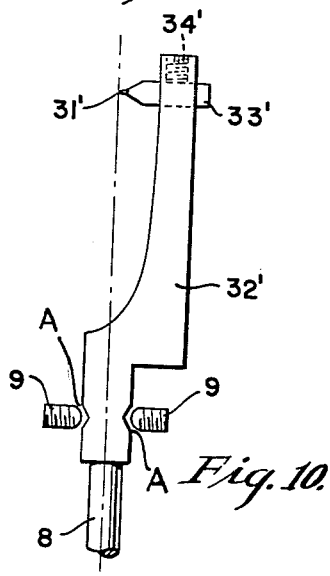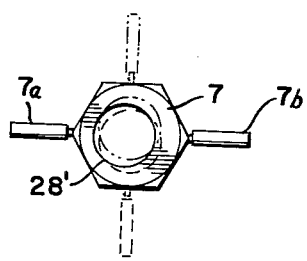

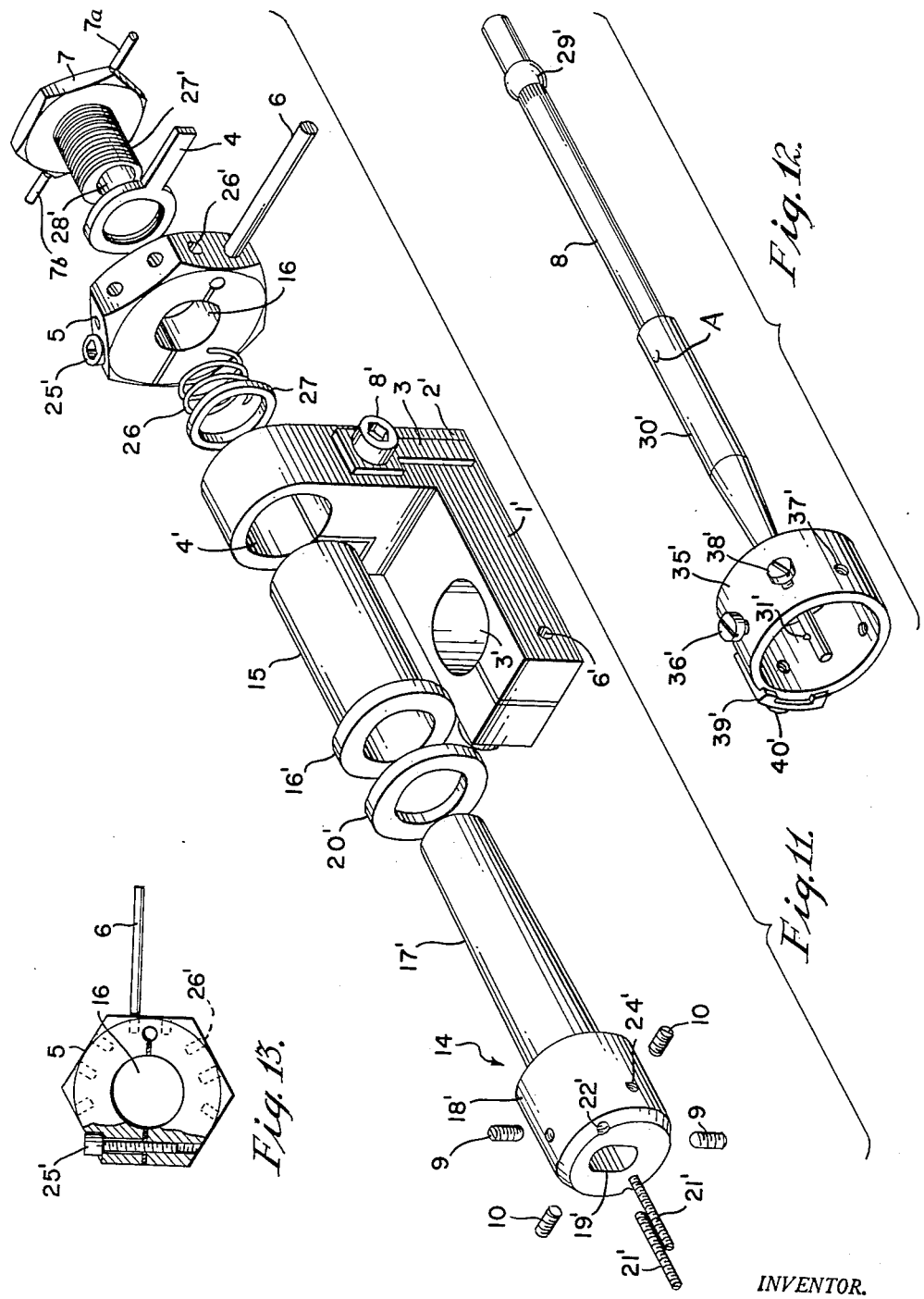

United States Patent Office 2,712,817
Patented July 12, 1955

2,712,817

DIAMOND RADIUS AND ANGLE DRESSER

Otto F. Trefz, Philadelphia, Pa.

Continuation of application Serial No. 267,977, January 24, 1952. This application December 13, 1952, Serial No. 325,806

7 Claims. (Cl. 125—11)

This invention relates to an instrument for cutting radii and angles in emery wheels and constitutes a continuation of my copending application Serial No. 267,977, filed January 25, 1952, now abandoned.

The primary object of this invention is to provide a wheel dresser of such construction and design as to permit the diamond cutter to rotate 360° thus enabling it to cut a perfect U-shaped concave radius of any predetermined dimension in an emery wheel.

Another object of the invention is to provide a wheel dresser particularly designed to cope with small radii, heretofore a problem in every tool shop.

Yet another object of the invention is to provide a wheel dresser which can readily be adapted to dress angles or tangents as well as radii.

It is well-known in the art that grinder spindle wear, the nature of the cutting edge of the diamond and the strain of the diamond against the emery wheel cause the original setting to fail. It is, therefore, an important object of this invention to provide an easily operated means for controlling the action of the dresser to overcome the operation discrepancies above noted.

Another object of the invention is to provide a wheel dresser which is rugged, reliable and highly accurate and which may include a means to limit the arc of the diamond and a special holder to permit the grinding of convex radii with the same control and accuracy as that used for producing concave radii.

These and other objects of the invention may be attained by a device, a preferred embodiment of which is shown in the accompanying drawings, wherein:

Figure 4 is a front end view of the dresser with the arc set ring removed;

Figure 6 is an elevational view of a threaded bushing with off-center hole at the rear of the dresser for fine adjustment of the diamond cutter;

Figure 7 is an elevational view of the dresser shown supported in a horizontal position;

Figure 8 is a front end view of the dresser with the arc set ring secured thereon;

Figure 9 is a side elevational view of the arc set ring per se;

Figure 10 is an elevational view of a special diamond holder adapted to grind convex radii;

Figure 11 is an exploded perspective view of the dresser exclusive of the spindle, diamond holder and arc set ring;

Figure 12 is an exploded perspective view of the spindle, diamond holder and arc set ring; and Figure 13 is a face view of a ring used to rotate the spindle, parts being broken away and shown in section to disclose details of construction.

Specific reference will now be made to the drawings wherein similar reference characters are used for corresponding elements throughout.

Figure 1:
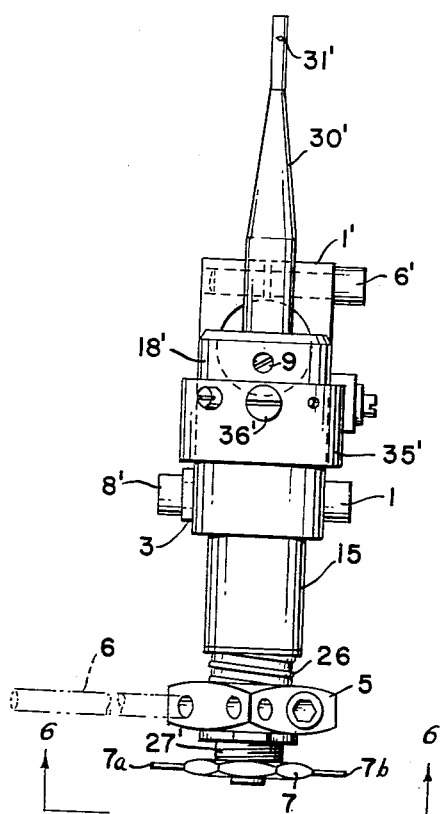
Figure 1 is an elevational view of the wheel dresser.
Figure 2:
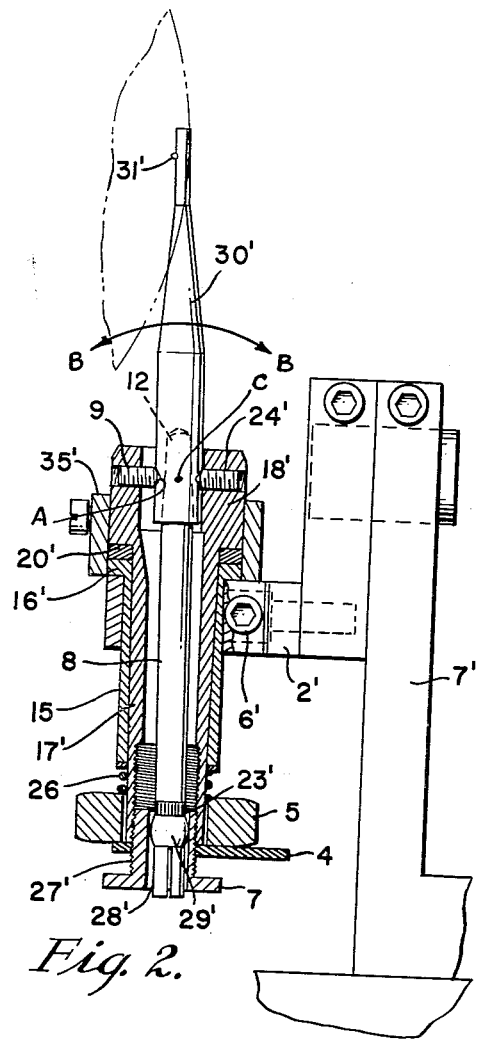
Figure 2 is a longitudinal sectional view through the dresser, the spindle thereof and the carrier therefor being shown in elevation.
Figure 5:
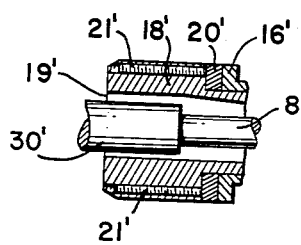
Figure 5 is a sectional view taken on the line 5—5 of Figure 4.

The present wheel dresser comprises an anchor base consisting of two rectangular blocks 1' and 2' secured in perpendicular relationship, rectangular block 2' fitting on top of block 1' each having split bores 3' and 4' respectively. The anchor base can be used on a magnetic chuck or may be bolted to a table 5' using the bore 3' and a clamping screw 6' to hold the dresser in a horizontal position as shown in Figure 7 or it may be bolted to an angleplate 7' to hold the dresser in a vertical position as shown in Figure 2. A clamping screw 1 is provided for the split bore 4'. The block 2' also carries a headed bolt 8' adapted to hold a lever or stop bar 3 in a desired position relative to the anchor base for a purpose which will appear later.

Received in the split bore 4' is a tapered bore bearing 15 having an annular shoulder 16' at its forward end. Received in the bearing is a housing unit 14 having a tubular tapered portion 17' complementary to the tapered bore bearing 15. The forward end of the housing unit includes an enlarged portion 18' having an elongated oblong opening 19'. A thrust ring 20' is positioned on the housing 14 between the shoulder 16' of the bearing 15 and the enlarged portion 18' of the housing. Adjustable pressure may be applied to the thrust ring by means of elongated screws 21' extending through axially extending threaded bores 22' in the enlarged portion 18'.

The tapered portion 17' of the housing 14 is internally threaded at its rear end as at 23' for a reason which will appear later.

Extending radially through the enlarged portion 18' of the housing 14 are four internally threaded bores 24', two of the aligned bores receiving set screws 9 the inner ends of which are rounded while the other two aligned bores which are generally perpendicular to the aforementioned aligned bores receive set screws 10 the inner ends of which are flat for a purpose which will appear later.

A ring 5 having an outer hexagonal face 5 engages the rear portion of the tapered housing 17' by means of a split bore 16 which may be firmly secured to the housing with the aid of a clamping screw 25'. The ring 5 is provided with a plurality of radial openings 26' for removably receiving a pin 6. A spring 26 is interposed between a washer 27 at the end of the bearing 15 and the ring 5.

Extending into the ring 5 is the externally threaded portion 27' of a control bushing 7, the threaded portion 27' engaging the internal threads 23' of the tapered portion 17' of the housing 14. The control bushing 7 is provided with an offset or eccentric axial bore 28'. The control bushing 7 also carries diametrically extending brass and steel pins 7a and 7b. A counternut 4 is threaded on the control bushing to lock the same in any desired adjusted position. The locking action takes place when the counternut presses against the outer face of the ring 5.

Extending through the housing 17' and the control bushing 7 is an extension rod or spindle 8 having a spherical bead 29' of a diameter approximating that of the offset bore 28' of the control bushing. Secured by the tapered end 12 of the extension rod 8 is a forwardly tapered diamond holder 30'. A diamond 31' is held in the holder adjacent its forward end and extends radially therefrom or in a position perpendicular to the axis of the holder.

For convex radii, a special holder 32' is secured by taper to the extension rod 8, the straight shank 33' of the diamond being held in position by a set screw 34'.

To limit the rotation of the diamond cutter, an arc set ring 35' is provided which is secured to the rotatable housing 14 by means of a screw 36'. A plurality of radial threaded bores 37' selectively receive a set screw 38' which is adapted to strike the stop bar or lever 3 to limit the rotation of the diamond cutter. A slotted clamp 39' receives another set screw 40' and makes it possible to adjust the desired degrees of limited circular movement.

Figure 3:
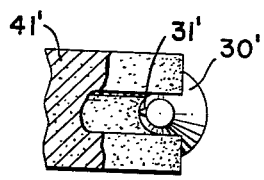
Figure 3 is an enlarged diagrammatic view of the front end of the dresser and illustrating the manner in which a concave radius is cut into an emery wheel.

To operate the dresser it will be understood that the anchor base can be secured to a table or an anchor plate to obtain a horizontal or vertical disposition of the dresser. To obtain an initial setting of the instrument for a desired radius, the set screws 9 and 10 are operated to move the diamond holder horizontally and vertically until the diamond is positioned properly on a conventional set gage 13. With the ring 5 locked in place on the rotatable housing 14 which is in turn operatively connected to the diamond holder 30' by means of the set screws 9, rotation of the ring with the pin 6 will turn the diamond 31' through 360° when the stop 3 is in the inoperative position as shown in Figure 11. The result is that a perfect U-shaped radius may be cut into an emery wheel 41' as shown clearly in Figure 3. This is so because in the dressing of an emery wheel, while the cutting diamond is rotated, the machine table which holds the dresser is moved in slowly against the wheel so that a cutting can take place. If the rotation of the diamond is limited to an arc less than approximately 200°, a concave groove can be formed but it will not be a true U shape. However, if the diamond can be rotated in an arc exceeding 200°, the side walls of the groove can be ground into substantial parallelism to effect a perfect U shape.

Because of grinder spindle wear, the wear of the cutting edge of the diamond and the strain of the diamond against the emery wheel, the original setting of the diamond as shown in Figure 7 will be upset. A disc gage can be used to check the variation from the original setting. A disc gage is a conventional tool having a disc of predetermined diameter which is made to fit into a groove. If the fit is not exact, the radius dresser must be reset to correct the misfit. To compensate for the variation and to reset the instrument properly, the counter-lever 4 is loosened and the control bushing 7 is operated. The brass pin 7a and the steel pin 7b mark the high points of the off-center bore 28'.

The mechanism by which the rotation of the bushing 7 effects fine readjustment of the initial setting is as follows. The set screws 10 with their flat inner ends bind the diamond holder 30'. However, the set screws 9 have inner rounded ends which are engaged in grooves cut into the diamond holder, as shown at A in Figures 2, 10 and 12. When the bushing 7 is rotated, the walls of the off-center bore 28' engage the bead 29' on the rod 8 of the diamond holder 30' causing the latter to shift its lateral position in the direction of the arrows B—B and about an imaginary axis C which is approximately perpendicular to the aligned axes of the set screws 9, as shown in Figure 2. In this action, the set screws 9 serve as diametrically opposed pivot points bearing upon the diamond holder, and the lateral shifting of the diamond holder relative to the housing 14 is possible because the inner size of the latter is sufficiently larger than the outer size of the former as is evident from the drawings. A 90° turn in one direction will increase the radius to a maximum value, such as .006", whereas a 90° turn in the opposite direction will decrease the radius by the same maximum value. When the required correction is obtained, the counternut 4 is retightened and the dresser is continued in operation until such time as resetting is again required.

If it is desired to limit the movement of the diamond, the arc stop clamp 39' can be adjusted accordingly. This is effected by positioning the stop bar 3 in such a manner that it is substantially parallel to the block 1. In such a position, rotation of the diamond in one direction will cause the set screw 38' of the arc set ring to strike the stop bar, while rotation in the opposite direction will cause the slotted clamp 39' to strike the stop bar.

While a preferred embodiment of the invention has been shown and described hereabove, it will be understood that minor variations can be made in the construction and arrangement of parts without departing from the spirit of the invention or the scope of the appended claims.

I claim:

1. A radius and angle dresser comprising an elongated tubular housing rotatable about its longitudinal axis, an elongated diamond holder extending through said housing, the inner size of said housing being sufficiently larger than the outer size of said diamond holder to permit relative movement between said housing and said diamond holder, a diamond cutter carried by said holder adjacent one of its ends, set screw means carried by said housing and securing said diamond holder to said housing in a predetermined initial adjusted position, said set screw means including a pair of diametrically opposed pivot points bearing on said holder, and means operative on said diamond holder for readjusting the lateral position of said diamond holder in said housing about an axis approximately perpendicular to that defined by the pivot points, said means including a bushing rotatably mounted on one end of said housing, said bushing including an off-center bore engaging a portion of said diamond holder at its other end.

2. The device of claim 1 wherein said bushing is threaded into said housing and said off-center bore is of uniform eccentricity from end to end.

3. The device of claim 2 and a counternut threaded on said bushing to lock said bushing in a predetermined adjusted position of rotation.

4. The device of claim 1 wherein said diamond cutter extends perpendicular to the longitudinal axis of said holder.

5. The device of claim 1 wherein said portion of said diamond holder which is engaged by said off-center bore is a spherical bead.

6. The device of claim 1 wherein said diamond holder includes an identation and said pivot points include screws with rounded ends rockably engaged in said indentation.

7. The device of claim 1 wherein said set screw means includes two pairs of diametrically opposed set screws having aligned axes generally perpendicular to each other, one pair of said set screws binding said diamond holder in an adjusted position, the other pair of set screws including rounded ends engaged for limited rocking movement in a pair of diametrically opposed indentations provided in said diamond holder, said rounded ends constituting said pivot points.

References Cited in the file of this patent

UNITED STATES PATENTS

| | | |
|---|---|---|
| 1,100,524 | Brown | June 16, 1914 |
| 1,482,916 | Dugar | Feb. 5, 1924 |
| 1,493,051 | O'Brien | May 6, 1924 |
| 1,573,153 | Garrison | Feb. 16, 1926 |
| 1,609,947 | Jolls | Dec. 7, 1926 |
| 1,626,232 | Gagarin | Apr. 26, 1927 |
| 2,077,727 | Ward | Apr. 20, 1937 |
| 2,336,650 | Storz | Dec. 14, 1943 |
| 2,403,266 | Dalzen | July 2, 1946 |
| 2,602,439 | Muench | July 8, 1952 |

FOREIGN PATENTS

| | | |
|---|---|---|
| 604,799 | Germany | Oct. 29, 1934 |